US012454098B2

United States Patent
Kaufmann et al.

(10) Patent No.: US 12,454,098 B2
(45) Date of Patent: Oct. 28, 2025

(54) DEVICE FOR RECEIVING AND FIXING THE COMPONENT CARRIER OF A 3D PRINTER BY UTILITIZING EXISTING AXES OF MOTION

(71) Applicants: DENTSPLY SIRONA Inc., York, PA (US); SIRONA DENTAL SYSTEMS GMBH, Bensheim (DE)

(72) Inventors: Bernhard Kaufmann, Heppenheim (DE); Thomas Hasenzahl, Darmstadt (DE); Tobias Schulz, Speyer (DE)

(73) Assignee: Dentsply Sirona Inc., York, PA (US)

( * ) Notice: Subject to any disclaimer, the term of this patent is extended or adjusted under 35 U.S.C. 154(b) by 12 days.

(21) Appl. No.: 18/578,136

(22) PCT Filed: Jun. 27, 2022

(86) PCT No.: PCT/EP2022/067577
§ 371 (c)(1),
(2) Date: Jan. 10, 2024

(87) PCT Pub. No.: WO2023/285125
PCT Pub. Date: Jan. 19, 2023

(65) Prior Publication Data
US 2025/0114998 A1    Apr. 10, 2025

(30) Foreign Application Priority Data
Jul. 12, 2021  (EP) .................................... 21184953

(51) Int. Cl.
*B29C 64/20* (2017.01)
*B29C 64/124* (2017.01)
(Continued)

(52) U.S. Cl.
CPC ............ *B29C 64/20* (2017.08); *B29C 64/124* (2017.08); *B29C 64/245* (2017.08); *B33Y 30/00* (2014.12)

(58) Field of Classification Search
CPC ..... B29C 64/20; B29C 64/245; B29C 64/124; B29C 64/129; B29C 64/135; B29C 64/232; B29C 64/236; B33Y 30/00
See application file for complete search history.

(56) References Cited

U.S. PATENT DOCUMENTS

2007/0077323 A1* 4/2007 Stonesmith ........... B29C 64/135
425/174

FOREIGN PATENT DOCUMENTS

CN    110625930    12/2019

OTHER PUBLICATIONS

"International Application Serial No. PCT/EP2022/067577, International Search Report mailed Sep. 14, 2022", 3 pgs.
(Continued)

*Primary Examiner* — Jerzi H Moreno Hernandez
(74) *Attorney, Agent, or Firm* — SCHWEGMAN LUNDBERG & WOESSNER, P.A.

(57) ABSTRACT

A 3D printer comprising a resin vat, a component carrier, a transport box for depositing the component carrier, a transport device for removing the component carrier from the transport box and transporting it into the resin vat, and for moving the component carrier downward and upward in the resin vat The transport device has translatory axes in the vertical and horizontal directions, each of which can be driven independently by a motor, the transport device having a locking device that detachably connects the component carrier. The locking device, during the downward movement along the vertical translatory axis, reaches a specific position (P) by the drive of the respective motor, at which a stop
(Continued)

located on the vertical translatory axis sets a coupling element in motion. A spring-loaded locking pin arranged in contact with the coupling element is immersed in a bayonet opening of the component carrier by the movement. The immersed locking pin can be brought into a locking position in the bayonet opening via the horizontal translatory axis.

4 Claims, 1 Drawing Sheet

(51) Int. Cl.
    *B29C 64/245*    (2017.01)
    *B33Y 30/00*     (2015.01)

(56) References Cited

OTHER PUBLICATIONS

"International Application Serial No. PCT/EP2022/067577, Written Opinion mailed Sep. 14, 2022", 7 pgs.
"International Application Serial No. PCT/EP2022/067577, International Preliminary Report on Patentability mailed Jan. 25, 2024", 8 pgs.
"European Application Serial No. 21184953.4, Extended European Search Report mailed Dec. 8, 2021", 6 pgs.
"European Application Serial No. 22737870.0, Noting of loss of rights pursuant to Rule 112(1) EPC mailed Mar. 5, 2024", 2 pgs.

* cited by examiner

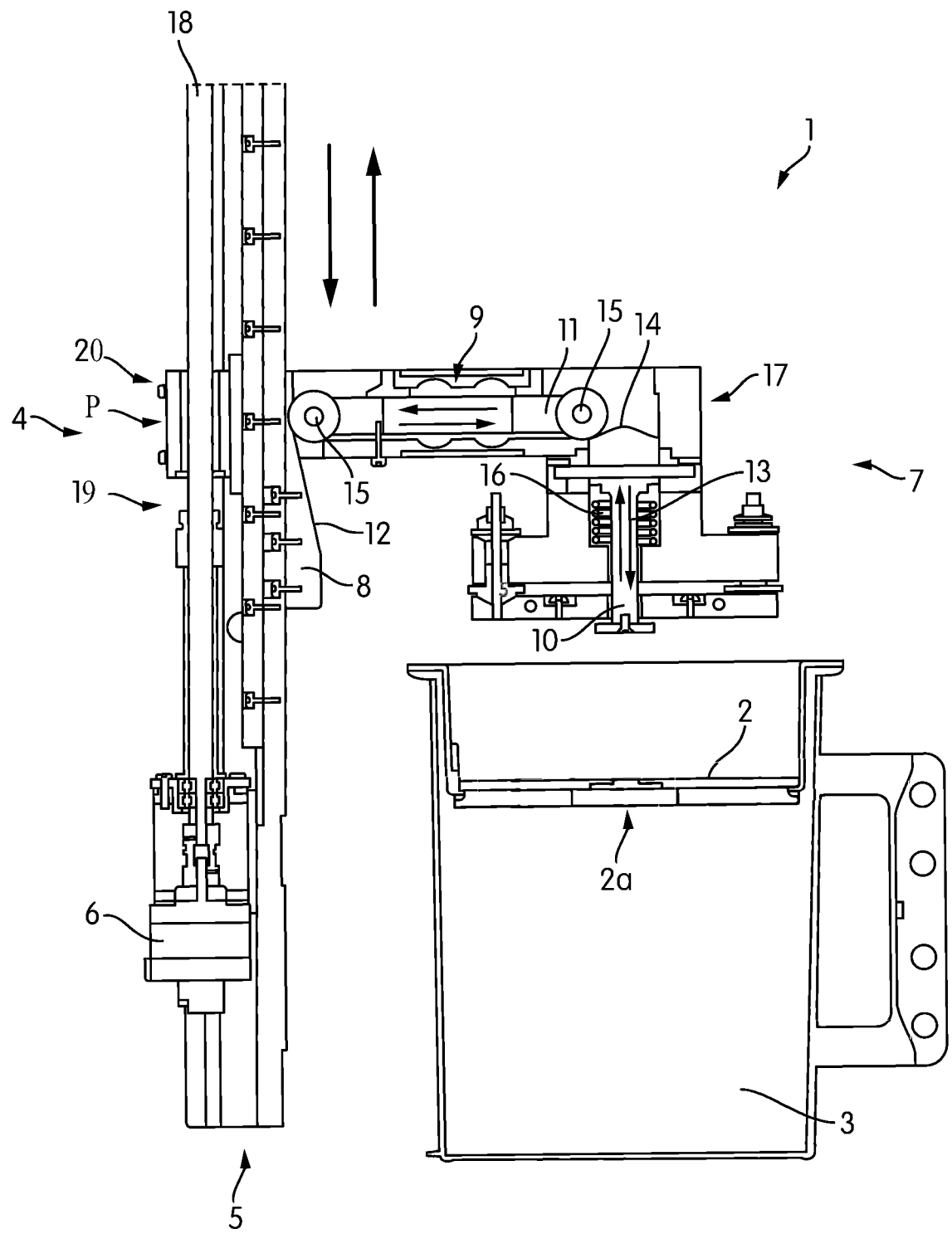

DEVICE FOR RECEIVING AND FIXING THE COMPONENT CARRIER OF A 3D PRINTER BY UTILITIZING EXISTING AXES OF MOTION

CROSS-REFERENCE TO RELATED APPLICATIONS

This is a National Phase application of International Application No. PCT/EP2022/067577, filed Jun. 27, 2022, which claims the benefit of and priority to European Application Ser. No. 21184953.4, filed on Jul. 12, 2021, which are herein incorporated by reference for all purposes.

TECHNICAL FIELD OF THE INVENTION

The present invention relates to 3D printers, and more particularly to the building platform of the 3D printer.

BACKGROUND OF THE INVENTION

Laser and DLP-based 3D printers based on the principle of "overhead vatpolymerization" process liquid photopolymer resins into solid components. In this production principle, the components are "pulled" layer by layer vertically out of a resin vat. For this purpose, they are attached directly or indirectly, via a support structure, to a component carrier (also known as building platform). To avoid defects in the components, the component carrier must be firmly connected to the 3D printer (Z-kinematics) during the printing process. For post-processing, after the printing process has been completed, the component must be removed from the 3D printer together with the component carrier. For this purpose, the connection between the 3D printer and the component carrier must be released. Before starting the printing process, a component carrier must again be inserted into the 3D printer and firmly connected to it.

In 3D printers on the market, the user usually inserts the component carrier manually into the printer and connects it firmly to the printer by means of a lever mechanism or screws. Alternatively, robotic systems are used that take over the manual part of the user.

SUMMARY OF THE INVENTION

An objective of the present invention is to provide a 3D printer having a pick-up and fixation device for the building platform that enables pick-up/drop-off of the build platform without additional drive motors.

The 3D printer according to the invention comprises: a resin vat for receiving liquid photopolymer resin for producing a solid component; a component carrier for pulling the component layer by layer out of the resin vat; a transport box for depositing the component carrier, wherein the transport box can be manually placed or fixed to the housing of the 3D printer at a designated position outside the resin vat; a transport device for removing the component carrier from the transport box and transporting it into the resin vat, and for moving the component carrier downwardly and upwardly or also sideways in the resin vat, wherein the transport device has translational axes in the vertical and horizontal directions, each of which can be driven independently by a motor, wherein the transport device has a locking device for detachable attachment to the component carrier. When the locking device reaches a specific position during the downward movement along the vertical translational axis by the drive of the respective motor, at which a stop located on the vertical translational axis sets a coupling element in motion, a spring-loaded locking pin connected to the coupling element is immersed in a bayonet opening of the component carrier by the movement, wherein the immersed locking pin can be brought into a locking position in the bayonet opening via the horizontal translatory axis.

The key feature of the invention is the use of existing translatory motion by the motors to couple with and uncouple the component carrier from the 3D printer.

In the 3D printer according to the invention, the two translatory axes present in the 3D printer and their respective motors are used to attach/detach the component carrier to/from the 3D printer; additional actuators/motors are not required. Before 3D printing. The user only has to place/fix the component carrier, deposited in the transport box, at the designated position in the 3D printer or remove it therefrom after the 3D printing and carry it to the post-treatment station.

In a preferred embodiment, the coupling element is provided in the form of a horizontally movable push rod. During downward movement, the push rod is set in motion by a slant of the stop. The locking pin is attached to a vertically installed spring-loaded tie rod. The horizontally movable push rod causes the locking pin to move downward into the component carrier via a slant on the vertically installed spring-biased tie rod. Preferably, the horizontally movable push rod has rollers at its two ends for contacting the respective slants.

In an alternative preferred embodiment, the coupling element is provided in the form of a rocker. During downward movement, the rocker is set in motion by the stop. The locking pin is attached to a vertically installed spring-loaded tie rod. Through the movement, the rocker guides the vertically installed spring-tensioned tie rod to a downward movement of the locking pin into the component carrier.

BRIEF DESCRIPTION OF THE DRAWINGS

In the following description, the present invention will be explained in more detail by means of exemplary embodiments with reference to the drawing, whereby FIG. 1—shows a schematic partial view of a 3D printer according to one embodiment of the invention.

DETAILED DESCRIPTION OF THE INVENTION

The reference numbers shown in the drawings designate the elements listed below, which are referred to in the following description of the exemplary embodiments.

1. 3D Printer
2. Component carrier
2a. Bayonet opening
3. Transport box
4. Transport device
5. Translatory axes
6. Motor
7. Locking device
8. Stop
9. Coupling element
10. Locking pin
11. Push rod
12. Slant
13. Tie rod
14. Slant
15. Roller
16. Spring 17. Z-Cantilever
18. Z Tower
19. Threaded screw
20. Threaded nut
P: Position on Z Tower (18)

FIG. 1 partially shows a 3D printer according to one embodiment. The 3D printer (1) comprises a resin vat (not shown) for containing liquid photopolymer resin for producing a solid component; a component carrier (2) for pulling the component out of the resin vat layer by layer; a transport box (3) for accommodating the component carrier (2), wherein the transport box (3) can be manually placed or fixed at a designated position outside the resin vat; a transport device (4) for removing the component carrier (2) from the transport box (3) and transporting it into the resin vat, and for moving the component carrier (2) downwardly and upwardly or also sidewards in the resin vat. The transport device (4) has translatory axes (5) in the vertical direction and horizontal direction (not shown), each of which can be driven independently by a motor (6). The transport device (4) has a locking device (7) for detachably attachment to the component carrier (2). The vertical translational axis (5) configures a Z-tower (18) in the Z-direction, in which the transport device (4) can be set in motion by the motor (6) in the Z-direction. The motor (6) is connected to a Z-cantilever (17) of the transport device (4) by a threaded screw (19) and threaded nut (20). The whole Z-tower (18) is movable in the horizontal direction via the horizontal translatory axis (not shown). The frame of the Z-tower (18) is connected to the second motor via another threaded screw and threaded nut. When the locking device (7) has reached the specific position (P) during the downward movement (see downward arrow) along the vertical translatory axis (5) by the drive of the respective motor (6), a coupling element (9) is set in motion by a stop (8) located on the vertical translatory axis (5). The movement causes a spring-loaded locking pin (10) arranged in connection to the coupling element (9) to be immersed into a bayonet opening (2a) of the component carrier (2). The component carrier (2) has a building platform on the lower side on which printing can be carried out. The immersed locking pin (10) can be brought into a locking position in the bayonet opening (2a) via the horizontal translatory axis.

The coupling element (9) is preferably provided in the form of a horizontally movable push rod (11) which can be set in motion by a slant (12) of the stop (8). The locking pin (10) is attached to a vertically installed spring-loaded tie rod (13). The horizontally movable push rod (11) leads to a downward movement of the locking pin (10) into the component carrier (2) via a slant (14) on the vertically installed spring-tensioned pull rod (13). The horizontally movable push rod (11) preferably has rollers (15) at its two ends for contacting the respective slants (12; 14). Alternatively, a rocker (not shown) can be used in place of the horizontally movable push rod (11).

In the following description, the mode of operation (pick-up/drop-off) is explained in detail according to one embodiment:

Downward Movement (See Downward Arrow in FIG. 1)

When the Z-Cantilever (17) reaches a specific position (P) on the Z-tower (18) during the downward movement, the push rod (11) is moved horizontally via the slant (12) located on the Z-tower (18). This movement, via the slope (14) on the spring-tensioned tie rod (13) installed vertically in the Z-tower (17), leads to a downward movement of the same and to the release of the locking pin (10). The locking pin (10) dips into the component carrier (2) and can be brought into the locking position for pick-up (or into the unlocking position for drop-off) via a horizontal movement of the Z-tower (18).

Upward Movement (See Upward Arrow in FIG. 1)

During the upward movement of the Z-tower (17), the component carrier (2) remains in the locking position on the locking pin (10) and is removed from the transport box (3). In the range of the slant (12) on the Z-tower (17), the push rod (11) now releases the tie rod (13) and this pulls the component carrier (2), and the building platform firmly to the Z-tower (17) via the spring tension (16).

The 3D printer (1) preferably has a sensor (not shown) that detects the transport box (3) at the designated position. The 3D printer (1) preferably has another sensor (not shown) that detects the component carrier (2) at the locking device (7) or performs force measurements. The 3D printer (1) has a control device that automatically controls the pick-up process of the component carrier (2) from the transport box (3), the transport process thereof into the resin vat, the 3D printing process in the resin vat, the transport process thereof from the resin vat to the transport box (3), and the deposit process of the component carrier (2) into the transport box (3). During 3D printing, the component carrier (2) can also be moved at an angle by the vertical and horizontal translatory axes. The sensor signals are transmitted to the control device. Force sensors, presence/absence sensors can be used as sensors.

The transport box (3) can be manually placed or mounted outside the resin vat and inside the 3D printer (1) in a designated position or space provided for this purpose (not shown). The transport box (3) is sealed tightly by the component carrier (2), preferably by means of a seal. The transport box (3) can be manually transported by the user to a post-processing station (not shown) after the 3D printing together with the component. In the post-processing station, the transport device (4) defined above can be used analogously to transport the component carrier (2) to the post-processing chambers. Post-processing chambers can be used to post-expose, wash, and/or dry the component. The transport box (3) can be made of UV opaque or partially UV transparent material. Preferably, a seal is provided between the component carrier (2) and the opening of the transport box (3) to seal against UV radiation and liquid leakage.

The invention claimed is:

1. A 3D printer comprising:
   a resin vat configured to contain liquid photopolymer resin for generating a solid component;
   a component carrier configured to pull out the component layer by layer from the resin vat;
   a transport box configured to deposit the component carrier, the transport box being manually placeable or fixable at a designated position outside the resin vat;
   a transport device configured to take the component carrier out of the transport box and transport it into the resin vat, and to move the component carrier downwardly, upwardly and/or sideways in the resin vat,
   wherein the transport device has a vertical translatory axis and a horizontal translatory axis, each of which is driven independently by a motor,
   wherein the transport device has a locking device for detachable attachment to the component carrier,
   wherein the locking device, during a downward movement along the vertical translatory axis, reaches, by the drive of the respective motor, a specific position at which a stop located on the vertical translatory axis sets a coupling element in motion, wherein a spring-loaded locking pin arranged in connection with the coupling element is immersed by the motion into a bayonet opening of the component carrier, and wherein the immersed locking pin can be moved via the horizontal translatory axis into a locking position or unlocking position in the bayonet opening.

2. The 3D printer according to claim 1, wherein the coupling element comprises a horizontally movable push rod which can be set in motion by a slant of the stop, wherein the locking pin is attached to a vertically installed spring-biased tie rod, and wherein the horizontally movable push rod leads to a downward movement of the locking pin into the component carrier via a slant on the vertically installed spring-biased tie rod.

3. The 3D printer according to claim 2, wherein the horizontally movable push rod has rollers at its two ends for contacting the respective slants.

4. The 3D printer according to claim 1, wherein the coupling element comprises a rocker that can be set in motion by the stop upon the downward movement, wherein the locking pin is attached to a vertically installed spring-biased tie rod, and wherein the rocker guides the vertically installed spring-biased tie rod to a downward movement of the locking pin into the component carrier.

\* \* \* \* \*